Jan. 17, 1967  JAMES E. WEBB  3,298,285
ADMINISTRATOR OF THE NATIONAL AERONAUTICS
AND SPACE ADMINISTRATION
REINFORCING MEANS FOR DIAPHRAGMS
Filed May 22, 1964

INVENTOR.
WILLIAM F. MACGLASHAN, JR.
BY
ATTORNEY

United States Patent Office 3,298,285
Patented Jan. 17, 1967

3,298,285
REINFORCING MEANS FOR DIAPHRAGMS
James E. Webb, Administrator of the National Aeronautics and Space Administration with respect to an invention of William F. MacGlashan, Jr.
Filed May 22, 1964, Ser. No. 369,640
3 Claims. (Cl. 92—94)

The invention described herein was made in the performance of work under a NASA contract and is subject to the provisions of Section 305 of the National Aeronautics and Space Act of 1958, Public Law 85–568 (72 Stat. 435; 52 U.S.C. 2457).

This invention relates to reinforcing means for diaphragms, and included in the objects of this invention are:

First, to provide a reinforcing means for diaphragms which is adapted to permit use of highly flexible diaphragms sensitive to minor changes in pressure under conditions wherein the pressure differential across the diaphragms may, by accident or design, be extremely high, in the range of several thousand pounds; this being accomplished without impairing the future function of the diaphragm.

Second, to provide a reinforcing means for diaphragms which has a wide range of applications, including, but not limited to, line valves, pressure regulators, pressure switches, and bellows such as used for flexible seals or connections.

Third, to provide a reinforcing means for diaphragms which employs a novelly arranged ring of bridging beams underlying the flexing portion of the diaphragm, and providing full support therefor without impairing the flexibility of the diaphragm.

With the above and other objects in view, as may appear hereinafter, reference is directed to the accompanying drawings in which.

Figure 1:
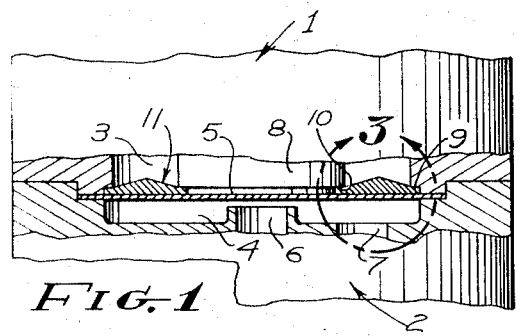
FIG. 1 is a fragmentary view showing one form of the reinforcing means for diaphragms incorporated in a valve structure, and showing the diaphragm in its flat or normal condition.
Figure 3:
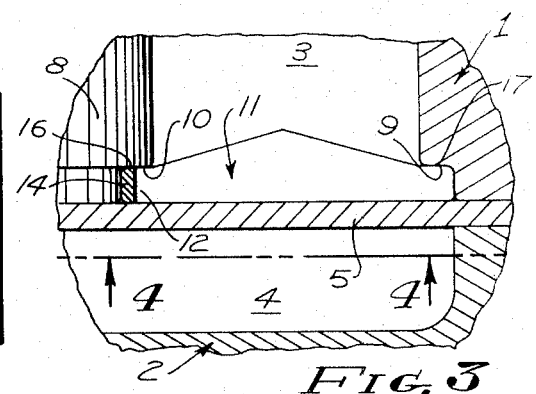
FIG. 3 is an enlarged, fragmentary sectional view taken within circle 3 of FIG. 1.

The structure in which the diaphragm and its reinforcing means may be mounted may be any one of several types of valves, such as line valves or regular valves, or the structure may be a pressure-sensitive device such as a pressure switch.

In any case, however, such structure includes a pair of body members 1 and 2 having confronting recesses 3 and 4 bordered by clamping faces between which is clamped the periphery of a diaphragm 5. In the structure illustrated in FIGS. 1 and 2, the body members 1 and 2 are indicated as forming portions of a valve which includes an inlet 6 and an outlet 7 communicating with the recess 4.

Located within the recess 3 on the opposite side of the diaphragm from the recess 4 is a mandrel 8 capable of axial movement within the recess 3. The periphery of the recess 3 adjacent the clamped margin of the diaphragm 5 is provided with a shoulder 9 confronting but spaced from the diaphragm. Similarly, the mandrel 8 is provided with a shoulder 10 confronting but spaced from the diaphragm 5. The annular region of the diaphragm between the shoulders 9 and 10 forms the active or displaceable portion of the diaphragm.

Figure 4:
FIG. 4 is an enlarged, fragmentary view of the bridging ring taken in the direction of 4—4 of FIG. 3, the overlying diaphragm being omitted.
Figure 4A:
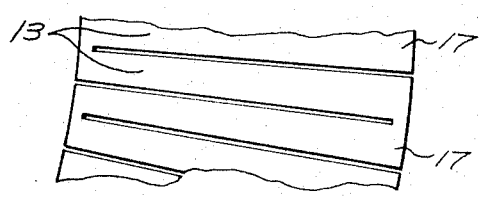
FIG. 4A is a fragmentary view similar to FIG. 4 showing a modified form of the bridging ring.

Fitted between the shoulders 9 and 10 is a bridging ring 11 which is provided with a plurality of radial slits 12 so as to form therebetween a plurality of bridging beams 13. The radial slits 12 preferably do not extend entirely through the bridging ring 11, but stop short of the inner periphery thereof so as to form narrow webs 14 joining adjacent bridging beams 13. In some instances it is desirable to slit the bridging ring 11 or to divide the bridging ring into one or more segments. In this case a slit 15 continues from a selected slit 12 through the web 14 as indicated in FIG. 4. Also the slits 12 may extend alternately from the radially inner and radially outer peripheries of the bridging ring 11, forming alternate webs 14 and 14a as shown in FIG. 4A.

The radially inner extremity of each bridging beam 13 rests on the shoulder 10 and forms a bearing face 16 capable of limited, pivotal or tilted movement relative to the shoulder 10. Similarly, the radially outer extremity of each beam 13 is provided with a bearing face 17 which rests on the shoulder 9. Between the bearing surfaces 16 and 17 the bridging beams 13 increase in depth toward their central portions.

The side of each bridging beam 13 is flat and in confronting and supporting relation to the diaphragm 5; that is, the diaphragm is supported by the surfaces of the ring 11 of the bridging beams 13. The width of the slots 12 between these surfaces constitute only a small fraction of the thickness of the diaphragm 5.

Figure 2:
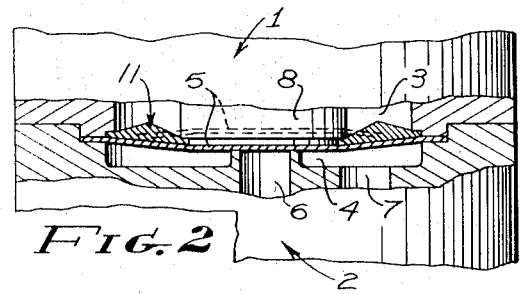
FIG. 2 is a similar fragmentary view showing the diaphragm and its support by solid lines in one extreme displaced position, and by dotted lines in an opposite extreme displaced position.

Operation of the reinforcing means for diaphragms is as follows:

The bridging ring 11 may deflect by relative axial displacement of the bearing faces 16 and 17 as indicated in FIGS. 1 and 2. Such deflection requires no appreciable energy. By reason of the narrow width of the slits 12, a relatively thin diaphragm 5 may overlie the bridging ring 11.

A thin diaphragm 5 offers low resistance to axial displacement of the central portion of the diaphragm 5, As a consequence the diaphragm 5 backed by the bridging ring 11 is quite sensitive to relatively slight changes in pressure. However, should the pressure across the diaphragm 5, by design or accident, become enormous, that is, in the range of several thousand pounds, the diaphragm 5 supported by its bridging ring 11 may withstand such pressure differentials without injury.

Figure 5:
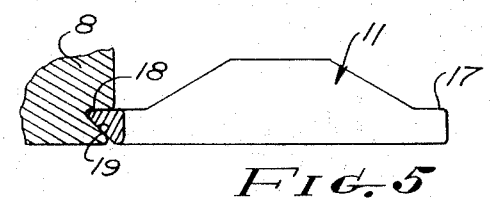
FIG. 5 is a fragmentary sectional view similar to FIG. 3 showing a modified form of the bridging ring.

Reference is directed to FIG. 5. It is sometimes desirable that the inner or outer periphery of the bridging ring 11 be retained with respect to its corresponding supporting member. This may be accomplished by beveling the webbed margin of the bridging ring 11 as indicated by 18, and the corresponding shoulder may form one side of a V-groove 19. In this case the bridging ring 11 is split in one or more places so that the beveled margin may be fitted into the V-groove 19.

Figure 6:
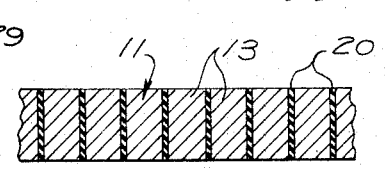
FIG. 6 is a sectional view taken substantially through 6—6 of FIG. 4 but showing a modified form of the bridging ring.

In some instances it is desirable to bond the bridging beams 13 or segments of the bridging ring 11 to each other by means of an elastomer 20 as shown in FIG. 6. The elastomer may completely fill the slits 12 or may be in the form of a thin coating on either or both sides of the bridging ring 11 so as to enter a superficial distance into the radial slits 12. In the latter case the freedom of movement of the bridging ring 11 is not appreciably changed. If, however, the elastomer 20 completely fills the slits 12, the stiffening of the bridging ring 11 is of course increased.

Figure 7:
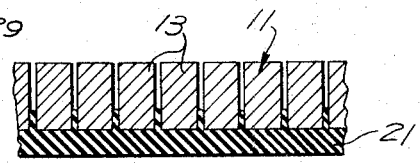
FIG. 7 is a similar sectional view showing a further modified form of the bridging ring wherein the diaphragm formed of elastomer is bonded to the bridging ring.

In some instances, as shown in FIG. 7, a diaphragm 21 corresponding to the diaphragm 5 may be bonded to the lower surface of the bridging ring 11 and penetrate any desired depth from a superficial distance to the full depth of the bridging beams 13. Still further, the metal diaphragm 5 may be bonded to the surface of the bridging ring 11 by solder or adhesive such as an epoxy resin.

Figure 8:
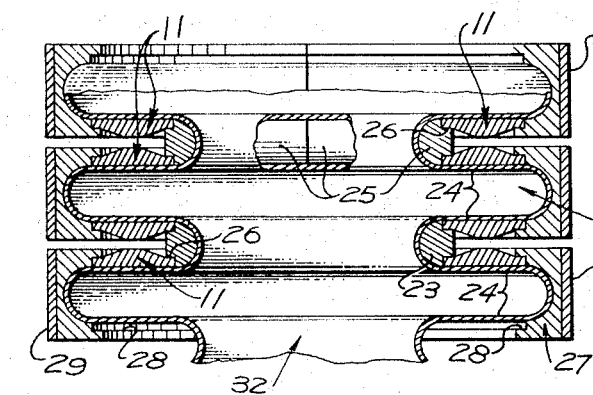
FIG. 8 is a fragmentary sectional view of a bellows, the diaphragms of which are supported by the reinforcing means.

The benefits of the reinforcing means for diaphragms is not limited to essentially flat diaphragms but may be employed to strengthen bellows-type diaphragms. In this case each radial portion of the bellows may be considered as a diaphragm element. In this respect reference is directed to FIG. 8 in which is illustrated a bellows 22 having external annular channels 23, the opposite sides of which form annular diaphragms 24.

The bottom portions of the channels 23 receive internal supporting rings 25 which are spit to facilitate insertion. These rings have shoulders 26 corresponding to the shoulders 9 of the first described structure. A pair of bridging rings 11 spit for assembly extend radially outward from each internal supporting ring 25 with their outer surfaces in supporting relation with the diaphragms 24.

A series of external supporting rings 27, which are also split, bridge between external channels 23 and are provided with shoulders 28 corresponding to the shoulders 10 for supporting the radially outer margins of the bridging beams 13 forming the elements of the bridging ring 11.

The external supporting rings 27 are encircled by bands 29 which resist outward displacement of the external supporting rings 27, the bridging rings 11, and the internal supporting rings 25. With this arrangement the sensitivity of the bellows is not appreciably changed; yet if the ends of the bellows are constrained, the internal forces of the bellows may be extremely high without damage to the bellows.

Figure 9:
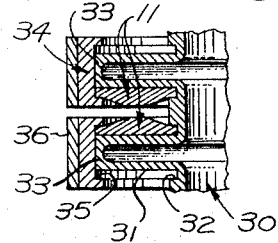
FIG. 9 is a fragmentary sectional view showing another type of bellows wherein the diaphragm elements are supported by the reinforcing means.

Reference is directed to FIG. 9. The reinforcing means lends itself to use with a machined-type bellows 30 having external channels 31 at the inner extremities which form supporting shoulders 32. Overlying hollow flanges 33 between the external channels 31 are external split supporting rings 34 corresponding to the rings 27 and are provided with shoulders 35 corresponding to the shoulders 26 and 10. Also the supporting rings 34 are surrounded by constraining bands 36. Bridging rings 11 extend between the shoulders 32 and 35.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. The combination with a diaphragm having an annular flexure portion of a reinforcing means comprising:
    (a) a ring of radiating beam elements disposed in supporting relation to said annular flexure portion and separated, at least in part, by radial slits;
    (b) a first supporting means encircling the radially outer extremities of said beam elements and forming a pivotal support therefor;
    (c) and a second supporting means within the radially inner extremities of said beam elements and forming a second pivotal support therefor;
    (d) one of said supporting means being displaceable relative to the other in response to a pressure differential across said diaphragm;
    (e) and an elastomer connecting said beam elements to maintain said beam elements in spaced relation.

2. The combination with a diaphragm having an annular flexure portion, of a reinforcing means comprising:
    (a) a supporting ring having a plurality of equally spaced radiating slits, partially severing said ring and some of said slits fully severing said ring into a plurality of attached beam elements, each beam element being of constant cross section in a transverse direction, increasing in thickness from its inner periphery and its outer periphery toward a point midway therebetween;
    (b) a first supporting means encircling the radially outer extremities of said beam elements and forming a pivotal support therefor;
    (c) and a second supporting means within the radially inner extremities of said beam elements and forming a second pivotal support therefor;
    (d) one of said supporting means being displaceable relative to the other in response to a pressure differential across said diaphragm.

3. A diaphragm reinforcing means as set forth in claim 2, wherein:
    (a) said slits are at least partially filled with an elastomer.

References Cited by the Examiner

UNITED STATES PATENTS

| | | | |
|---|---|---|---|
| 832,708 | 10/1906 | Thomson | 92—94 |
| 1,034,323 | 7/1912 | Tanner | 92—94 |
| 2,173,678 | 9/1939 | Brendlin | 92—42 |
| 2,335,276 | 11/1943 | Heintz | 92—99 |
| 2,704,548 | 3/1955 | Ralston | 92—94 X |
| 2,989,982 | 6/1961 | Soderberg et al. | 92—40 X |

FOREIGN PATENTS

| | | |
|---|---|---|
| 157,609 | 12/1939 | Austria. |
| 814,328 | 3/1937 | France. |
| 11,225 | 1900 | Great Britain. |
| 297,216 | 9/1928 | Great Britain. |

MARTIN P. SCHWADRON, *Primary Examiner.*

I. C. COHEN, *Assistant Examiner.*